United States Patent

[11] 3,613,548

| [72] | Inventors | Paul V. Motts;<br>Wayne K. Stoops, both of Connersville, Ind. |
|---|---|---|
| [21] | Appl. No. | 787,935 |
| [22] | Filed | Dec. 30, 1968 |
| [45] | Patented | Oct. 19, 1971 |
| [73] | Assignee | H. H. Robertson Company<br>Pittsburgh, Pa. |

[54] AIR-MIXING VALVE ASSEMBLY
12 Claims, 16 Drawing Figs.

[52] U.S. Cl. ............................................. 98/38,
137/625.44 X, 236/13
[51] Int. Cl. ......................................................... F24f 13/04
[50] Field of Search............................................ 137/605,
625.44 X; 251/87, 172; 98/38; 236/13

[56] References Cited
UNITED STATES PATENTS
| 2,537,535 | 4/1970 | Larsson | 236/12 |
| 801,654 | 10/1905 | Dodd | 137/527.4 |
| 1,915,994 | 6/1933 | Harnett | 98/38 |
| 2,366,520 | 1/1945 | Griffith | 251/167 |
| 3,445,087 | 5/1969 | Priese et al. | 251/172 |

Primary Examiner—William E. Wayner
Attorneys—Harry B. Keck and George E. Manias

ABSTRACT: An air-mixing valve assembly for high-pressure air-conditioning systems. The valve assembly includes a damper disposed between opposed gasketed openings which are provided in spaced-apart walls. Link hinge means supports the damper for swinging movement about two spaced generally parallel axes, between the walls, toward and away from engagement with a selected one of the gasketed openings. A gasket of improved configuration is provided at each opening. A positive seal is formed when the damper engages either of the gasketed openings.

PATENTED OCT 19 1971
3,613,548
SHEET 1 OF 2
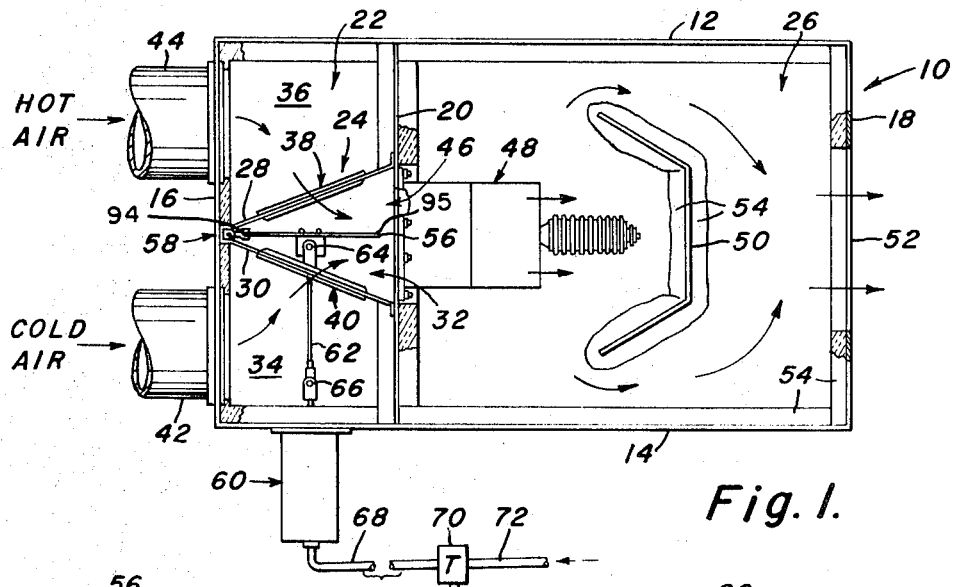
Fig. 1.
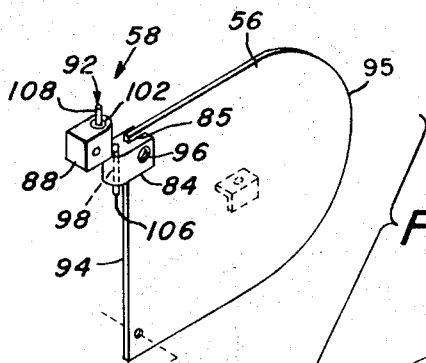
Fig. 2.
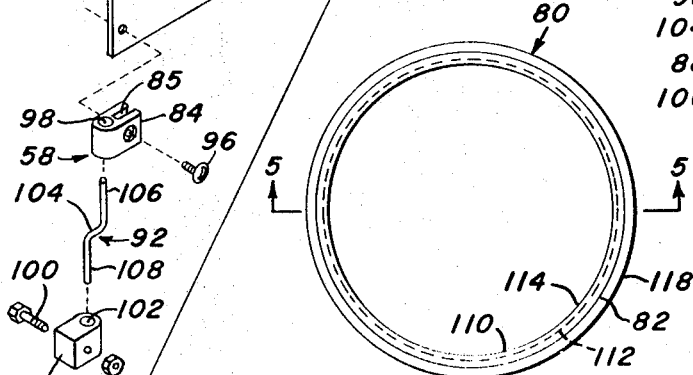
Fig. 4.
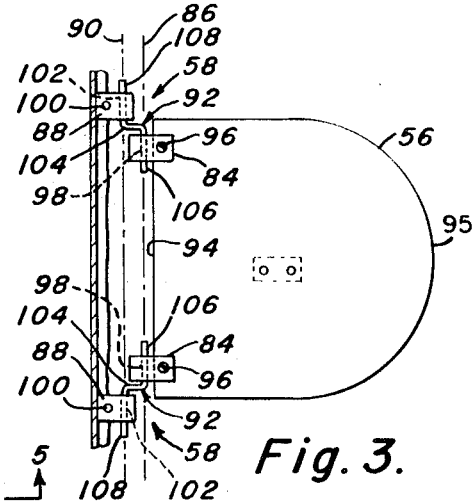
Fig. 3.
Fig. 5.
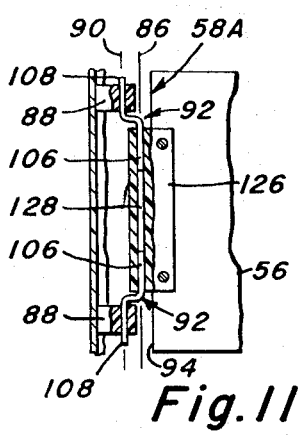
Fig. 11.
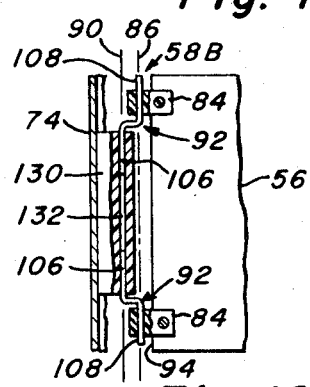
Fig. 12.
INVENTORS.
PAUL V. MOTTS &
WAYNE K. STOOPS
By George E. Namias
AGENT

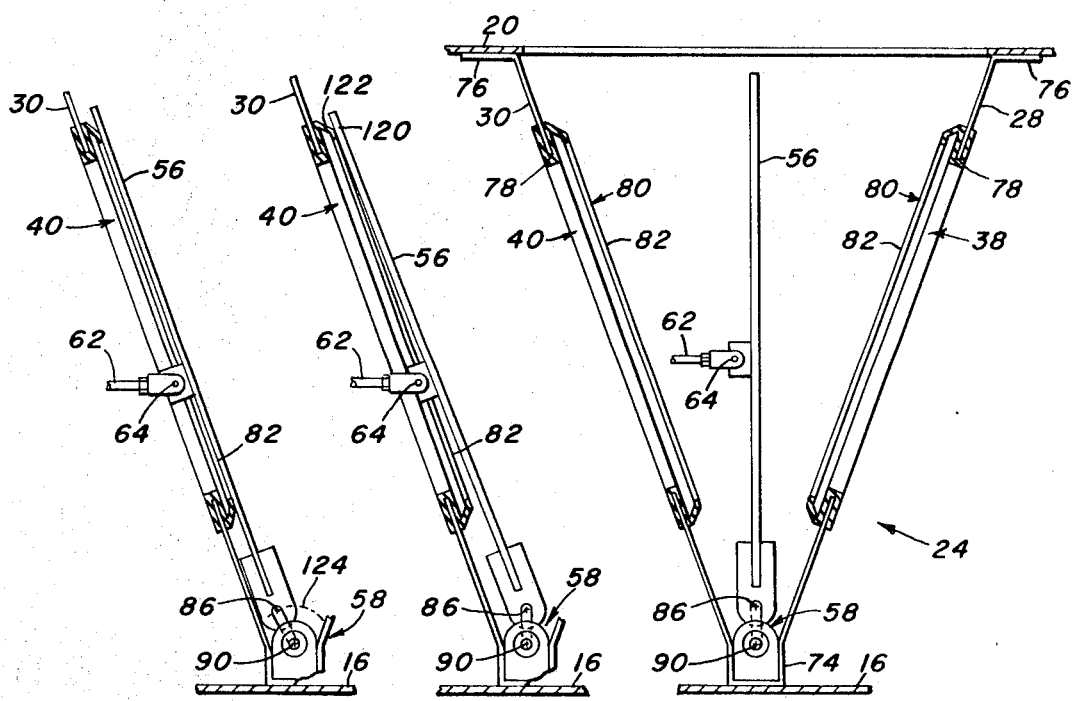
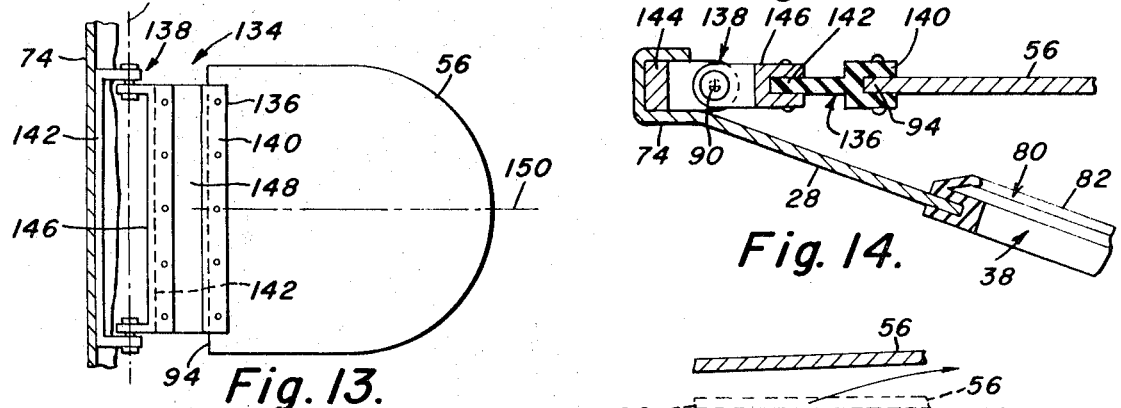
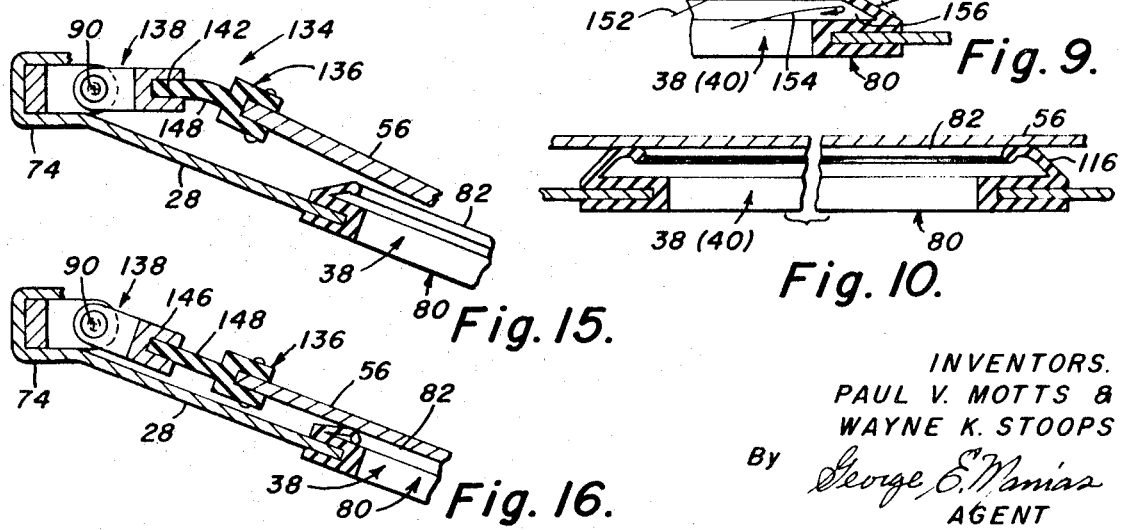
INVENTORS.
PAUL V. MOTTS &
WAYNE K. STOOPS
BY George E. Namias
AGENT

AIR-MIXING VALVE ASSEMBLY

BACKGROUND OF THE INVENTION

1. Field of the Invention

This invention relates to an air-mixing valve for high-pressure air-conditioning systems, and more particularly to an air-mixing valve of the type having improved means for pivotally supporting a damper for swinging movement between opposed gasketed openings to achieve a positive seal of either opening. generally Z-shaped 2. Description of the Prior Art Air-mixing valves for high-pressure air-conditioning systems, having a damper pivotally supported at one end for swinging movement between opposed air inlet openings are known in the art. See U.S. Pat. No. 3,395,633. One difficulty encountered in such prior art air-mixing valves is that a positive seal may not be achieved when the damper is engaged with the gasketed air inlet openings. Misalignment between the damper and the opening, small irregularities such as curvature of the parts inhibit obtaining a positive seal.

Prior art air-mixing valves employ a compressed gasket systems to obtain a positive seal. In that system, a positive seal is made by compressing the gasket between the damper and the wall or conduit supporting the gasket. It will be appreciated that in high-pressure air-conditioning systems, a positive seal can only be made if the force exerted on the damper to compress the gasket is equal to or greater than the force of the conditioned air acting on the upstream face of the damper. Thus, as the upstream air pressure increases the pressure exerted by the damper on the gasket also must increase to maintain a positive seal.

SUMMARY OF THE INVENTION

The principal object of the invention is to provide an air-mixing valve of the type described wherein a positive seal is obtained between the damper and either of the opposed gasketed openings.

A further object of this invention is to provide an air-mixing valve of link type described having an improved pivotal support about which the damper is pivotal into positive sealed engagement with either of the opposed gasketed openings.

Still another object of this invention is to provide a gasket of improved configuration which contributes to the achievement of a positive seal regardless of the upstream air pressure.

The present invention provides an air-mixing value having a pair of spaced-apart walls defining a mixing chamber and presenting opposed openings. A gasket is applied to each of the spaced-apart walls at the rim of the opening. Each gasket presents a gasket edge.

In accordance with the present invention, the damper is positioned between the spaced-apart walls and confronts the gasketed openings. Link hinge means providing spaced parallel pivot axes, supports the damper along one edge thereof for swinging movement between the spaced-apart walls. The damper is pivotal into a first position wherein the damper engages a gasket edge portion of a selected gasketed opening and diverges away from the remainder of the gasket edge. The damper is then pivoted into a second position wherein the damper is in flush contact with the entire surface of the gasket edge to seal the selected gasketed opening. Motor means is provided for swinging the damper about the pivotal axes of the linkage means, toward and away from engagement with the gasket edge of each of the opposed openings.

In accordance with the preferred embodiment, the link hinge means comprises moveable pivot block means secured to one end of the damper and having axially aligned first bores defining a first pivot axis. Stationary pivot block means is provided, having axially aligned second bores adjacent to the first bores and defining a second pivot axis. Link means in the form of generally Z-shaped pin members, are provided for pivotally connecting the movable pivot block means to the stationary pivot block means. The overall arrangement is such that the second pivot axis is stationary with respect to the spaced-apart walls and the first pivot axis is movable along an arc.

In accordance with an alternative embodiment, the link hinge means comprises a flexible strip having one end secured to the damper and an opposite end spaced from the end of the pivotal damper. A hinge is provided including a movable member secured to the opposite end of the flexible strip and a stationary member rigidly supported in relation to the spaced-apart walls.

Further in accordance with this invention, the gasket provided at each opening, includes an annular flexing lip positioned to be engaged by the damper. As the damper approaches the gasket, the velocity of the air passing between the annular flexing lip and the damper increases causing the annular flexing lip to be blown outwardly into engagement with the approaching damper thereby to provide a positive seal. As the upstream pressure increases, the annular flexing lip will balloon outwardly increasing its area of contact with the damper. The upstream pressure maintains the annular flexing lip in positive sealed engagement with the damper.

BRIEF DESCRIPTION OF THE DRAWINGS

FIG. 1 is a plan view, partly in cross section, of a typical mixing box incorporating a mixing valve of this invention;

FIG. 2 is an exploded isometric view of a damper blade and link hinge means for pivotally supporting the same;

FIG. 3 is a fragmentary side view of the assembled damper blade and link hinge means, illustrating spaced parallel pivot axes;

FIG. 4 is a front view of a gasket employed in the mixing valve of this invention;

FIG. 5 is a cross-sectional view, taken along the line 5—5 of FIG. 4, illustrating the configuration of the gasket;

FIGS. 6, 7 and 8 are fragmentary plan views of the mixing valve of this invention, illustrating the pivotal movement of the damper;

FIG. 9 is a fragmentary cross-sectional view illustrating the action of an annular flexing lip of the gasket relative to the approaching damper;

FIG. 10 is a fragmentary cross-sectional view similar to FIG. 8, illustrating the damper engaged with the annular flexing lip;

FIGS. 11 and 12 are fragmentary side views illustrating alternative arrangements of the link hinge means;

FIG. 13 is a fragmentary side view, similar to FIG. 3, illustrating an alternative embodiment of the link hinge means; and FIGS. 14, 15 and 16 are fragmentary plan views, similar to FIGS. 6, 7 and 8, illustrating the pivotal movement of the damper shown in FIG. 13.

DESCRIPTION OF THE PREFERRED EMBODIMENT(S)

FIG. 1 illustrates a typical air-mixing box 10 having sidewalls 12, 14 and end walls 16, 18. A transverse partition 20 divides the interior of the mixing box 10 into an air-receiving enclosure 22 housing an air-mixing valve 24 of this invention and a mixing chamber 26.

The air-mixing valve 24 includes a pair of spaced-apart partitions or walls 28, 30 which divide the interior of the air-receiving enclosure 22 into a central air outlet or valve chamber 32 and a pair of air inlet chambers 34, 36, one on each side of the central air outlet chamber 32. The spaced-apart walls 28, 30 have opposed gasketed openings 38, 40, each providing communication between the central air outlet chamber 32 and one of the air inlet chambers 34, 36.

First duct means 42 conveys a first stream of air at a selected condition, for example cold air, through the end wall 16 into the air inlet chamber 34. Second duct means 44 conveys a separate stream of air at a second selected condition, for example hot air, through the end wall 16 into the air inlet chamber 36. The separate streams of air flow through the opposed gasketed openings 38, 40 in the spaced walls 28, 30 into the central air outlet chamber 32, through a valve outlet opening 46 provided in the transverse partition 20. The combined streams of air pass through a constant volume control unit 48. The constant volume control unit 48 may comprise that control unit described and illustrated in U.S. Pat. No. 2,890,716. Essentially, the control unit 48 is responsive to upstream pressures of the combined streams of conditioned air discharged from the mixing valve 24 into the mixing chamber 26. A baffle 50 interposed between the control unit 48 and the end wall 18 promotes mixing of the two streams of conditioned air. The mixed air stream is discharged through a main discharge opening 52 into the enclosure or room being conditioned.

All of the interior surfaces of the mixing box 10 receive a suitable acoustic insulation 54.

The air-mixing valve 24 of this invention, additionally includes a damper 56 having opposite first and second edges 94, 95 respectively. The damper 56 is pivotally supported adjacent the end wall 16 (along the first edge 94) by link hinge means 58. Motor means 60 preferably mounted exteriorly of the mixing box 10, includes an operating rod 62 having one end pivotally connected to the damper 56 intermediate of the first and second edges 94, 95, as at 64. The operating rod 62 extends through the gasketed opening 40 in the wall 30 and is connected to the motor means 60 through an intermediate pivot connection 66. The motor means 60 is pneumatically operated and receives pressurized control air through conduit means 68 which, in turn, is connected to a thermostat schematically illustrated at 70. Conduit means 72 conveys control air to the thermostat 70. Accordingly, the motor means 60 is temperature responsive to conditions within a room as sensed by the thermostat 70.

In the preferred arrangement, the operating rod 62 of the motor means 60 is biased into a retracted condition. The arrangement is such that should the supply of control air be interrupted for any reason, the damper 56 will be displaced into sealed engagement with the gasketed opening 40 communicating with the inlet chamber 34. Thus, only hot air is discharged into the enclosure being conditioned.

In the preferred arrangement of the present air-mixing valve 24 and as best shown in FIG. 6, the spaced-apart walls 28, 30 converge toward the link hinge means 58. The spaced-apart walls 28, 30 may be formed from a single metal sheet and have a generally U-shaped connecting portion 74 adapted to support the link hinge means 58. In addition, the ends of the spaced-apart walls 28, 30 remote from the connecting portion 74 may be provided with flanges 76 which are secured to the transverse partition 20; and the upper and lower edges of the spaced-apart walls 28, 30 may be provided with flanges (not visible) for securing the spaced-apart walls to the bottom and top walls of the air-mixing box 10.

Each of the spaced-apart walls 28, 30 has an opening 78. A gasket 80 is applied to the rim of each of the openings 78 and presents a gasket edge 82 in confronting relation with the damper 56.

The preferred embodiment of the link hinge means 58 is illustrated in FIGS. 2 and 3. The link hinge means 58 includes, in general, movable pivot block means 84 having a pivot axis 86 (FIG. 3) associated therewith; stationary pivot block means 88 having a pivot axis 90 (FIG. 3) associated therewith; and link means 92 for pivotally connecting the movable pivot block means 84 to the stationary pivot block means 88.

In particular, the movable pivot block means 84 have slots 85 (FIG. 2) receiving the first edge 94 of the damper 56 and have axially aligned first bores 98 defining the pivot axis 86. Fasteners 96 secure the movable pivot block means 84 to the damper 56.

The stationary pivot block means 88 is secured to the generally U-shaped portion 74 (FIG. 3) by fasteners 100 and have axially aligned second bores 102 defining the pivot axis 90.

The link means 92, as best shown in FIG. 2, comprises a generally Z-shaped pin member having a central portion 104 and opposite extending parallel leg portions 106, 108. The leg portions 106 are received in the axially aligned first bores 98 of the movable pivot block means 84. The leg portions 108 are received in the axially aligned second bores 102 of the stationary pivot block means 88.

The overall arrangement of the link hinge means 58 is such that the damper 56 is supported for swinging movement about either or both of the pivot axes 86, 90 as will be more fully explained.

Referring to FIGS. 4 and 5, the gasket 80 includes an annular body portion 110 provided with an annular recess 112 for receiving the rim of one of the openings 78 and an inner edge 114 defining the gasketed opening 38 (40). In addition, the gasket 80 includes an annular flexing lip 116 having a trailing edge 118 adjoining the annular body portion 110 and the leading or gasket edge 82. The annular flexing lip 116 has a frustoconical configuration wherein the trailing edge 118 has a larger diameter than the leading or gasket edge 82. As will be more fully described, the annular flexing lip 116 is deflectable toward the annular body portion 110 when contacted by the damper 56 to achieve a positive seal of the gasketed opening.

Operation of the present air-mixing valve 24 will now be described with reference to FIGS. 6, 7 and 8. In FIG. 6, the damper 56 is shown positioned intermediate of the gasketed openings 38, 40. When it is desired to seal one of the gasketed openings, for example the gasketed opening 40, the damper 56 is swung by the operating rod 62 about the pivot axis 86 into a first position, illustrated in FIG. 7, wherein that damper end 120 remote from the link hinge means 58 engages a gasket edge portion 122 of the gasket edge 82 and the damper 56 diverges away from the remainder of the gasket edge 82 of the gasketed opening 40. Thereafter, the damper 56 is moved farther by the operating rod 62 and is pivoted about the point of engagement with the gasket edge portion 122 and both of the pivot axes 86, 90 into a second position shown in FIG. 8. In the second position, the damper 56 is in flush contact with the entire surface of the gasket edge 82 to seal the gasketed opening 40. It will be noted in FIG. 8 that the pivot axis 86 is movable along a radial arc 124 about the pivot axis 90. Thus the damper 56 may be placed in flush contact with the gasket edge 82 independently of its pivoting about the pivot axis 90.

FIGS. 9 and 10 illustrate how a positive (airtight) seal is made between the damper 56 and the gasket 80.

In FIG. 9, the arrows 152 indicate the airstream flowing between the damper 56 and the gasket 80. The arrow 154 indicates a portion of the airstream 152 which enters a recess or pocket 156 beneath the annular flexing lip 116. As the damper 56 approaches the gasket 80, the velocity of the airstreams 152, 154 increases causing the annular flexing lip 116 to be blown outwardly to meet the approaching damper 56 as shown in dotted outline. At the instant of contact, an airtight seal is formed and the airflow is stopped even though an increasing upstream air pressure is exerted on the damper 56.

As the air pressure on the upstream side of the damper 56 increases, the annular flexing lip 116 balloons outwardly, as shown in FIG. 10, thereby increasing the area of contact between the damper 56 and the annular flexing lip 116. Therefore, in the present gasket system, the upstream air pressure maintains the annular flexing lip 116 in overall sealed engagement with the damper 56.

Two alternative arrangements of the link hinge means 58 are illustrated in FIGS. 11 and 12. Corresponding numerals will be employed to identify corresponding parts heretofore described.

FIG. 11 illustrates link hinge means 58A including a single movable pivot block means 126 secured to the damper end 94 and having an axial bore 128 receiving the leg portions 106 of the link means 92. The opposite leg portions 108 of the link means 92 are received in the stationary pivot block means 88. The link hinge means 58A provides the two spaced parallel pivot axes 86, 90.

FIG. 12 illustrates link hinge means 58B comprising a single stationary pivot block means 130 secured to the generally U-shaped portion 74 and having an axially bore 132 receiving the leg portions 106 of the link means 92. The opposite leg portions 108 of the link means 92 are received in the movable pivot block means 84. The link hinge means 58B provides the two spaced parallel pivot axes 86, 90.

The pivot block means 84, 88, 128, 130 may be formed from plastic materials, such as acetal resins, polycarbonates, polyamides and, in general, any of the crystalline thermoplastic materials; or from suitable metals. The link means 92 may be formed from brass wire and the like.

An alternative embodiment of the present link hinge means is illustrated in FIGS. 13 to 16 inclusive. Corresponding numerals will be employed to identify corresponding parts heretofore described.

Referring to FIGS. 13 and 14, there is illustrated link hinge means 134 comprising a flexible strip 136 and a hinge 138. The flexible strip 136 includes a slotted end 140 and an opposite end 142. The slotted end 140 receives the damper end 94 and is secured to the damper 56 by any suitable means.

The hinge 138 includes a stationary member 144 secured to the generally U-shaped portion 74 and a movable member 146 pivotally connected to the stationary member 144 for pivoting about a pivot axis 90. The movable member 146 is slotted. The opposite end 142 of the flexible strip 136 is received within the slotted movable member 146 and is rigidly secured thereto by any suitable means.

The operation of the link hinge means 134 is similar to the operation of the link hinge means 58. Accordingly, the damper 56, as shown in FIG. 15, may be displaced toward one of the gasketed openings, for example the gasketed opening 38, to engage the gasket edge 82 (engagement not illustrated). During the initial movement of the damper 56, the flexible strip 136 may be bent in the region 148 between the slotted end 140 and the opposite end 142 as shown in FIG. 13. As the damper 56 continues to move toward the gasketed opening 38, the movable member 146 of the hinge 138 pivots about the pivot axis 90. As shown in FIG. 16, the damper 56 is in flush contact with the entire surface of the gasket edge 82 to seal the gasketed opening 38.

It will be appreciated that the region 148 of the flexible strip 136 provides a pivot axis corresponding to the pivot axis 86 (FIG. 3) of the preferred embodiment. In addition, it will be appreciated that the flexible strip 136 also permits the damper 56 to twist, for example about an axis 150 (FIG. 13), to place the damper 56 in flush contact with the entire surface of the gasket edge 82 (FIG. 16). The flexible strip 136 thus constitutes a universal joint between the damper 56 and the hinge 138.

I claim:

1. In an air-mixing valve having a pair of spaced-apart walls defining a mixing chamber and presenting opposed air inlet openings, a gasket applied at the rim of each of said openings and a damper positioned between said spaced-apart walls and confronting said opposed openings, said damper having opposite first and second edges, the improvement comprising:

hinge means for supporting said damper along said first edge for swinging movement between said spaced-apart walls, said hinge means providing a pair of spaced-apart pivot axes extending parallel with said first edge of said damper, said damper being pivotal about said pivot axes into flush sealing contact with the entire periphery of the gasket of a selected one of said opposed openings; and operating means connected to said damper intermediate of said first and second edges for swinging said damper about said pivot axes toward and away from flush sealing contact with the gasket of each of said opposed openings.

2. The improvement of claim 1 wherein one of said pivot axes is stationary with respect to said spaced-apart walls, the other of said pivot axes is movable about said one of said pivot axes along an arc.

3. The improvement of claim 1 wherein one of said pivot axes is disposed between said first edge of said damper and the other of said pivot axes.

4. The improvement of claim 1 wherein said spaced-apart walls converge toward said hinge means.

5. The improvement of claim 1 wherein said operating means includes an operating rod extending through one of said opposed openings and is pivotally connected to said damper.

6. The improvement of claim 1 wherein said hinge means comprises:

movable pivotal block means secured to said first edge of said damper and having axially aligned first bores defining one of said pivot axes;

stationary pivot block means having axially aligned second bores each adjacent to one of said first bores and defining the other of said pivot axes; and link means for pivotally connecting said movable pivot block means to said stationary pivot block means.

7. The improvement of claim 6 wherein said link means comprises:

generally Z-shaped pin members, each having a central portion and oppositely extending parallel leg portions at the ends thereof, one of said leg portions extending into one of said first bores and the other of said leg portions extending into one of said second bores.

8. The improvement of claim 1 wherein said hinge means comprises:

A flexible strip having first edge secured to said one end of said damper and an opposite end spaced from said first edge; and A hinge including a stationary member and a movable member, said movable member being secured to said opposite end of said flexible strip.

9. The improvement defined in claim 1 wherein said gasket comprises:

an annular body portion applied to and enclosing the rim of said opening; and an annular flexing lip having a trailing edge adjoining said body portion and a leading edge spaced from said annular body portion in the direction of said damper.

10. The improvement of claim 9 wherein said annular flexing lip has a frustoconical configuration.

11. The improvement of claim 9 wherein said annular body portion includes an inner edge and an outer edge;

said trailing edge adjoining said outer edge.

12. The improvement of claim 10 wherein the diameter of said trailing edge is larger than that of said leading edge.